US 12,352,466 B2

(12) United States Patent
Prigge et al.

(10) Patent No.: US 12,352,466 B2
(45) Date of Patent: Jul. 8, 2025

(54) HUMIDIFIER WITH IMPROVED MIST GENERATION

(71) Applicant: Vitality Ventures HK Company Limited, Mill Valley, CA (US)

(72) Inventors: Grant Prigge, Belvedere-Tiburon, CA (US); Marko Brelak, Svrljig (RS)

(73) Assignee: Vitality Ventures HK Company Limited, Mill Valley, CA (US)

( * ) Notice: Subject to any disclaimer, the term of this patent is extended or adjusted under 35 U.S.C. 154(b) by 385 days.

(21) Appl. No.: 18/090,676

(22) Filed: Dec. 29, 2022

(65) Prior Publication Data
US 2023/0314019 A1    Oct. 5, 2023

Related U.S. Application Data

(60) Provisional application No. 63/296,051, filed on Jan. 3, 2022.

(51) Int. Cl.
*F24F 6/12*    (2006.01)
*C02F 1/00*    (2023.01)
*C02F 1/32*    (2023.01)
*F24F 6/00*    (2006.01)

(52) U.S. Cl.
CPC .............. *F24F 6/12* (2013.01); *C02F 1/001* (2013.01); *C02F 1/325* (2013.01); *F24F 2006/006* (2013.01); *F24F 2006/008* (2013.01)

(58) Field of Classification Search
CPC ...... B01F 23/2133; B01F 31/46; B01F 31/80; B01F 35/7172; C02F 1/001; C02F 1/325; F24F 6/12; F24F 2006/006; F24F 2006/008

USPC ............................................. 261/81, DIG. 48
See application file for complete search history.

(56) References Cited

U.S. PATENT DOCUMENTS 4,085,893 A * 4/1978 Durley, III ............. F02M 27/08
                                                             239/102.2
2023/0324061 A1* 10/2023 Prigge ....................... F24F 6/12
                                                             422/120

FOREIGN PATENT DOCUMENTS

CN     206724397 U   * 12/2017
CN     111829119 A   * 10/2020
CN     212439518 U   *  2/2021

OTHER PUBLICATIONS

English Machine Translation of CN 206724397 U (Year: 2017).*
English Machine Translation of CN 111829119 A (Year: 2020).*
English Machine Translation of CN 212439518 U (Year: 2021).*

* cited by examiner

*Primary Examiner* — Charles S Bushey
(74) *Attorney, Agent, or Firm* — Maxwell J. Petersen; FisherBroyles, LLP (57) ABSTRACT

The present invention provides a humidifier that provides for improved mist generation, to provide for rapid evaporation and rapid humidification and to avoid common problems such as bacteria/pathogen growth associated with conventional approaches. The invention relates to the field of room humidifier devices, and more particularly to an ultrasonic humidifier having improved mist generation for aerosolization of source water.

20 Claims, 10 Drawing Sheets

HUMIDIFIER WITH IMPROVED MIST GENERATION

This patent application claims the benefit of U.S. Provisional Application Ser. No. 63/296,051, filed on Jan. 3, 2022, the disclosure of which is incorporated herein by reference.

FIELD OF THE INVENTION

The present invention relates to the field of room humidifier devices, and more particularly to an ultrasonic humidifier having improved mist generation for aerosolization of source water.

DISCUSSION OF RELATED ART

Prolonged exposure to dry climatic conditions can impact respiratory system health, promoting symptoms for conditions such as asthma, bronchitis, sinusitis, and nosebleeds. The air in the lungs is at saturated conditions and breathing dry air can lead to developing dehydration since the breathing organism is losing its water reserves during respiration. The water content of the ambient air is strongly influenced by the temperature. For example, during cold winter months, the moisture content of the air is low. When that air is breathed in and heated, its relative humidity is further reduced, again leading to dehydration.

Humidity levels in homes are recommended to be in a range of 30% to 50% when the temperature is around 20 degrees Celsius. Too little humidity is detrimental for the reasons discussed above. Additionally, there is a growing body of evidence on the health benefits of maintaining proper indoor humidity. For example, recent studies have shown that increasing indoor humidity from 20% to 40% can decrease influenza infection rates by 80%. It is estimated that 15% of American homes have a humidifier. Humidifiers are electrical appliance-type devices employed in buildings to increase the relative humidity levels in homes, offices, or to ensure quality and handling capabilities in manufacturing processes. Too much humidity is also problematic because it can reduce evaporation through skin on hot days or promote mold growth. Therefore, the humidification process should be controlled carefully to keep the relative humidity in the optimal range despite the daily temperature variations. Maintaining the optimal levels of room humidity will improve human comfort, help lower the transmission rate of disease-causing bacteria and reduce the effect of static electricity in manufacturing clean rooms and in computer rooms.

A common problem in humidification technology is how to vaporize a certain amount of water to increase relative humidity uniformly throughout the room volume without causing excess condensation and water drops on the surfaces around the humidification device. Usually, a mist of water droplets is generated through an atomization process, and consequently the water droplets are naturally evaporated. Conversion from liquid to vapor phase is a thermodynamic process which depends on water droplet surface area, water droplet and air temperatures, vapor pressure in the air, and induced air speed in the room. Vaporization requires a certain amount of latent heat since the entropy of the vapor is higher than the entropy of the liquid phase. Dynamical models of vaporization usually assume that air in proximity to the water droplet surface is saturated at 100%, which then eventually is dissipated across the more distant layers of air.

Of various available humidification technologies, humidification by ultrasonic transducers has shown many advantages including high energy efficiency, silent operation, lower cost of operation, low maintenance and small size. While developing a humidifier device using ultrasonic transducers, even though there are several advantages for ultrasonic piezoelectric transducers, making a high-performance device that can cause more rapid changes in humidity, faster evaporation, less water condensation etc., involves consideration of several crucial parameters.

Ultrasonic humidifiers are believed to be the most prevalent type of humidifier, at least for the consumer market, as they tend to be the most efficient and have the lowest cost compared to the alternatives. Such humidifier devices typically use a ceramic piezoelectric diaphragm vibrating at an ultrasonic frequency to create water droplets that exit the humidifier as a cool fog with little or no perceived noise, which is desirable.

What is needed is a humidifier that can provide for improved mist generation, to provide for rapid evaporation and humidification and to avoid common problems such as bacteria/pathogen growth associated with conventional approaches.

SUMMARY

The present invention provides a humidifier that provides for improved mist generation, to provide for rapid evaporation and rapid humidification and to avoid common problems such as bacteria/pathogen growth associated with conventional approaches.

BRIEF DESCRIPTION OF THE FIGURES

An understanding of the following description will be facilitated by reference to the attached drawings, in which.

DETAILED DESCRIPTION

Operation of known room air humidifier appliances can increase room air humidity, but often slowly, or at high fan speed with the resulting disadvantage of increased noise. Additionally, room air humidifier devices often introduce airborne contaminants into the room air, which is undesirable and can be harmful to one's health if inhaled. The contaminants include bacteria and other pathogens that may grow within the water reservoir or elsewhere in accumulated water within the humidifier. The present invention provides a humidifier 100 that provides for improved mist generation, to provide for rapid evaporation and rapid humidification, even at low fan speeds, and to avoid common problems such as bacteria/pathogen growth associated with conventional approaches. Further, in certain embodiments, the humidification chamber assembly providing mist generation is configured as a modular unit that is readily replaceable in the event of malfunction, degradation of efficiency, or accumulation of undesirable pathogens.

Figure 1:
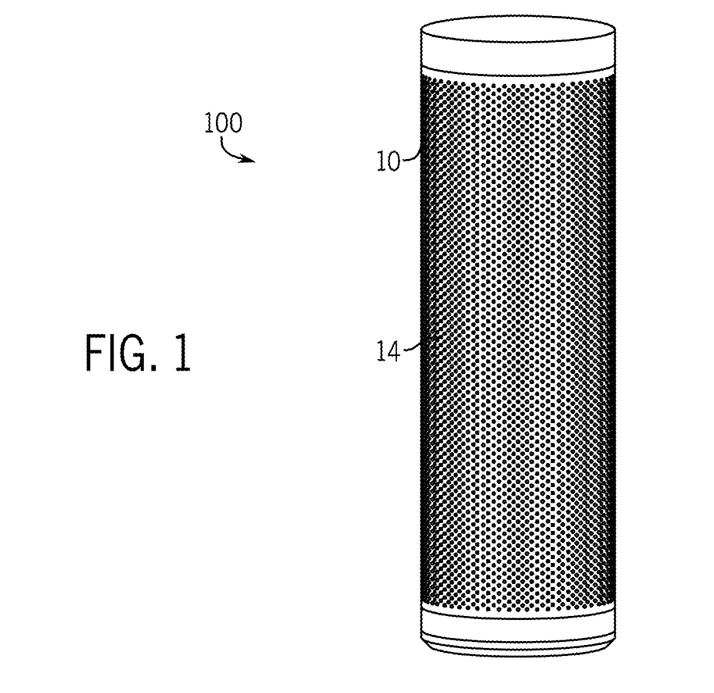
FIG. 1 is a front view of an exemplary humidifier in accordance with an exemplary embodiment of the present invention.
Figure 2:
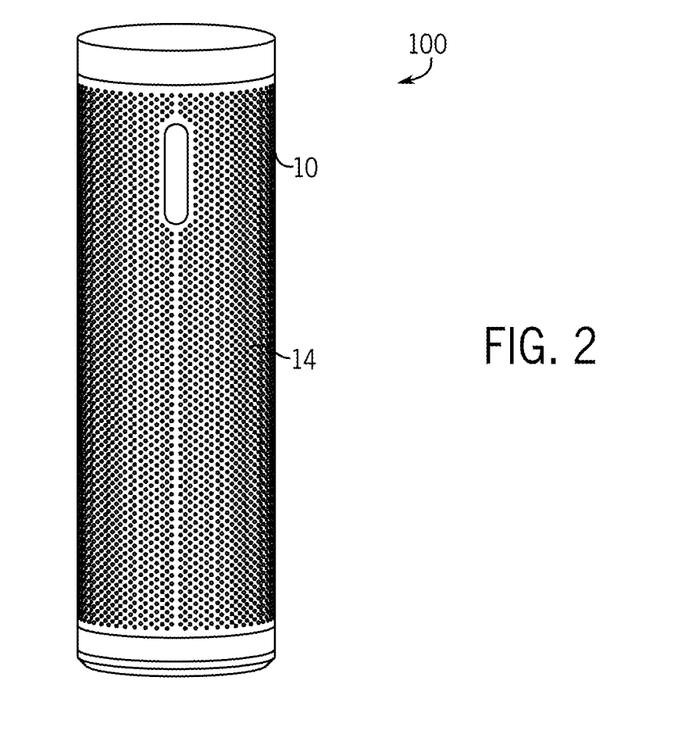
FIG. 2 is a side view of an exemplary humidifier of FIG. 1.
Figure 3:
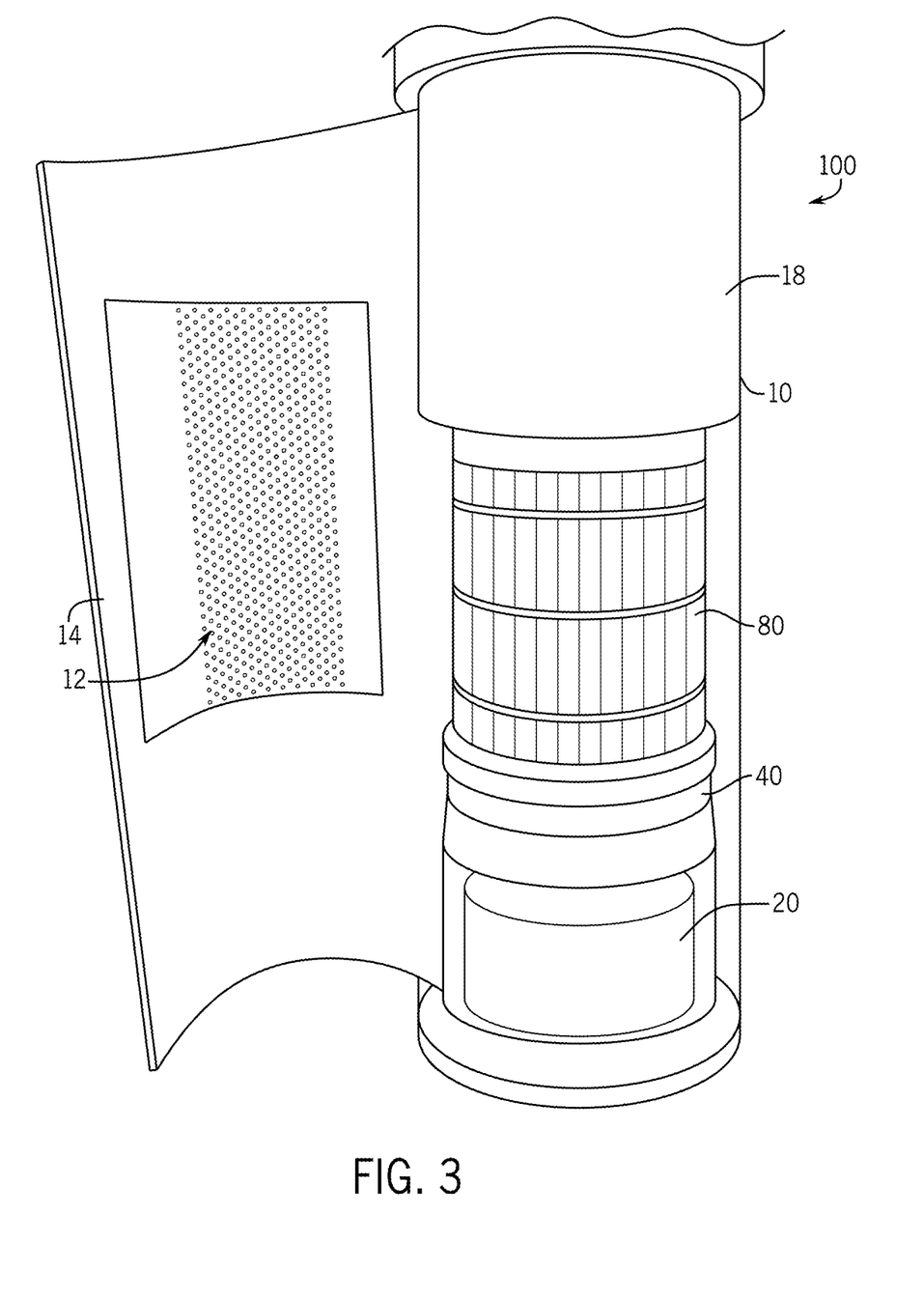
FIGS. 3 and 3B are front views of an exemplary humidifier of FIG. 1, with FIG. 3 showing a front cover open for illustrative clarity, and with FIG. 3B showing the front cover closed.
Figure 3B:
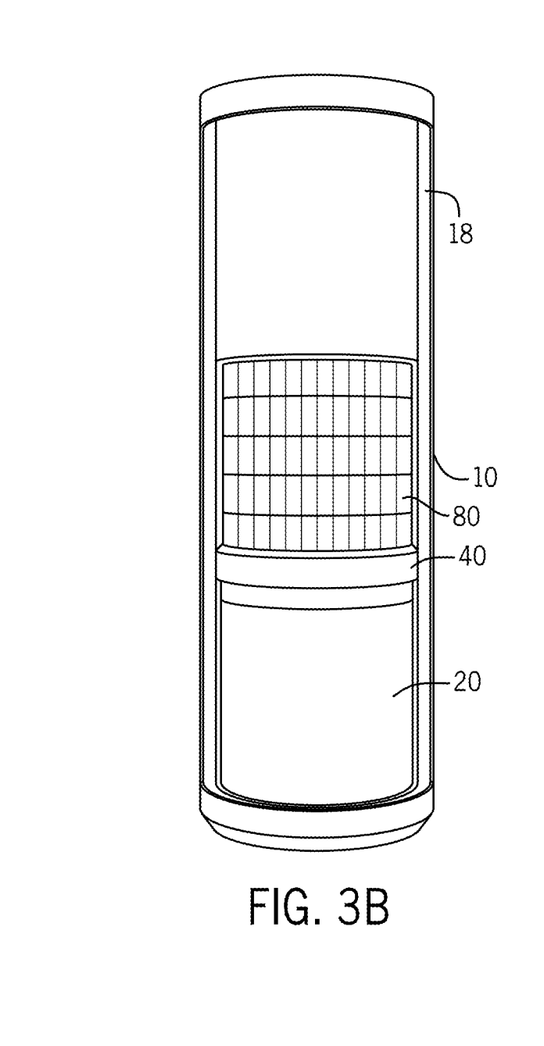
Figure 4:
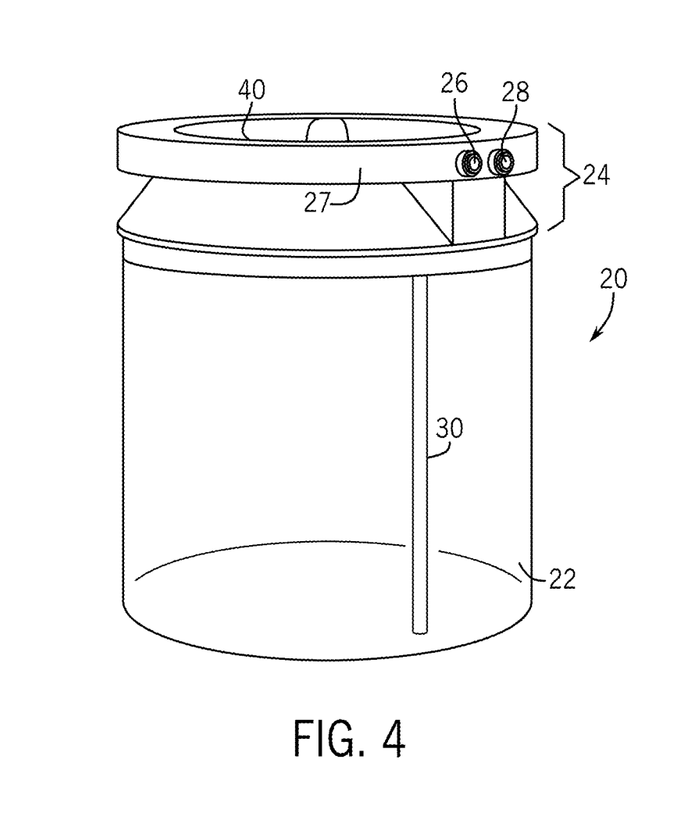
FIG. 4 is a rear perspective view of the water reservoir of the exemplary humidifier of FIG. 1.
Figure 5:
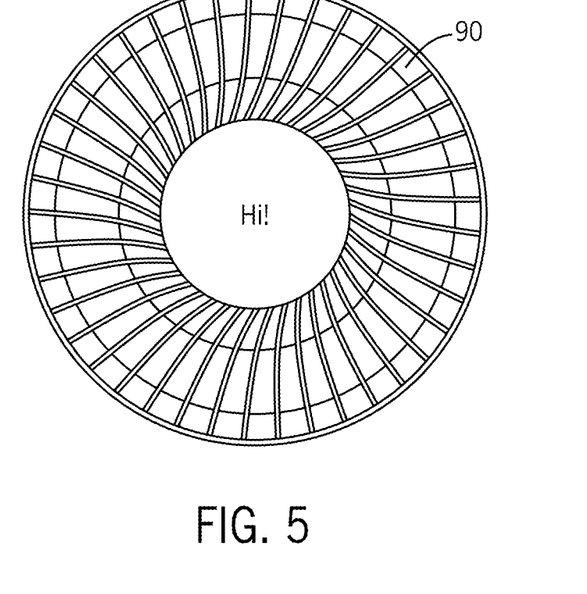
FIGS. 5 and 6 are top and rear perspective views of the humidifier of FIG. 1.
Figure 6:
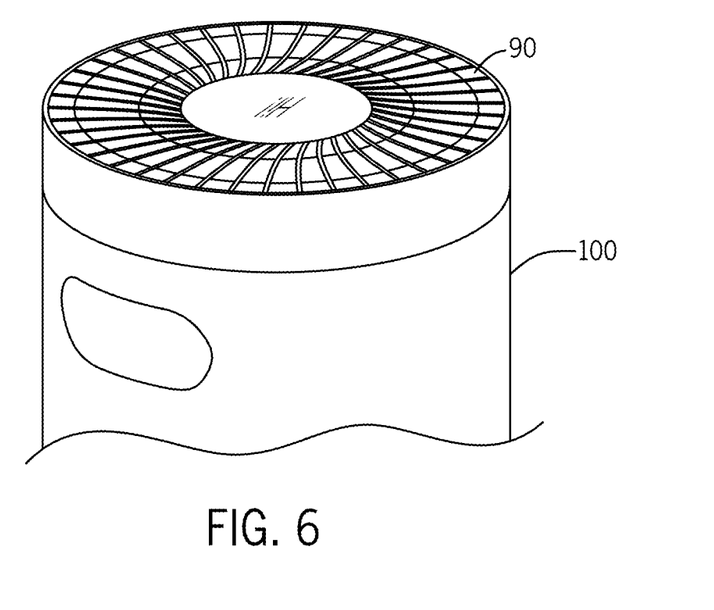
Figure 7:
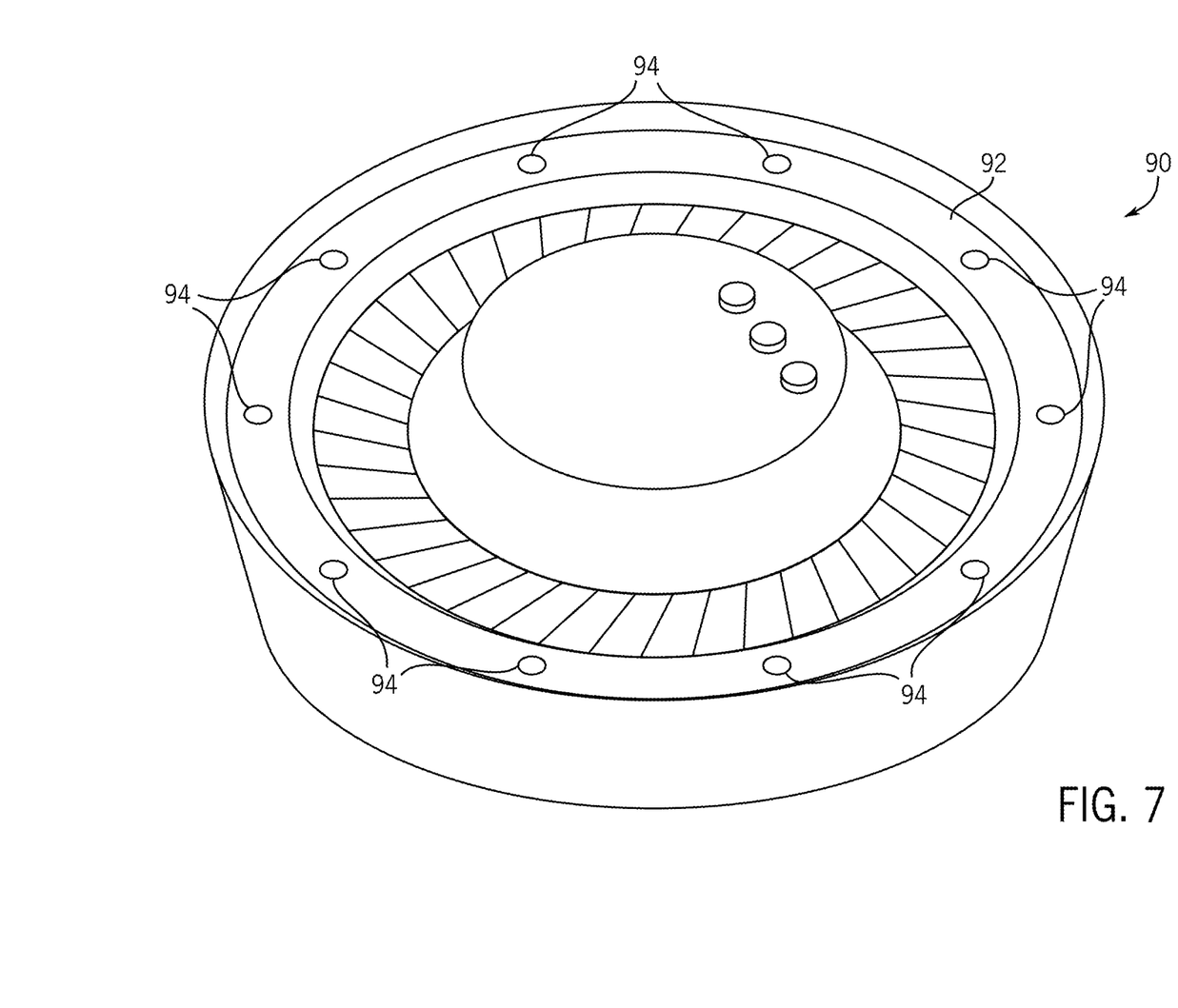
FIG. 7 is a top perspective view of the humidification chamber, showing a portion removed to reveal the vaporization ring of the humidifier of FIG. 1.
Figure 8:
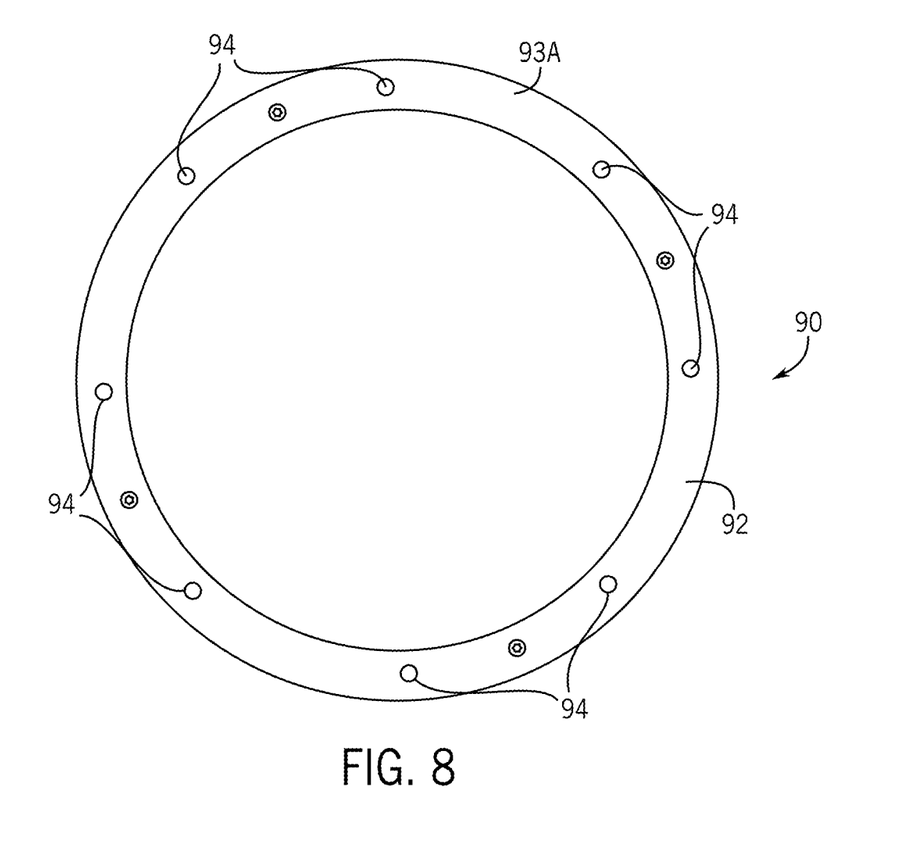
FIG. 8 is a top view of the humidification chamber of the exemplary humidifier of FIG. 1.
Figure 9:
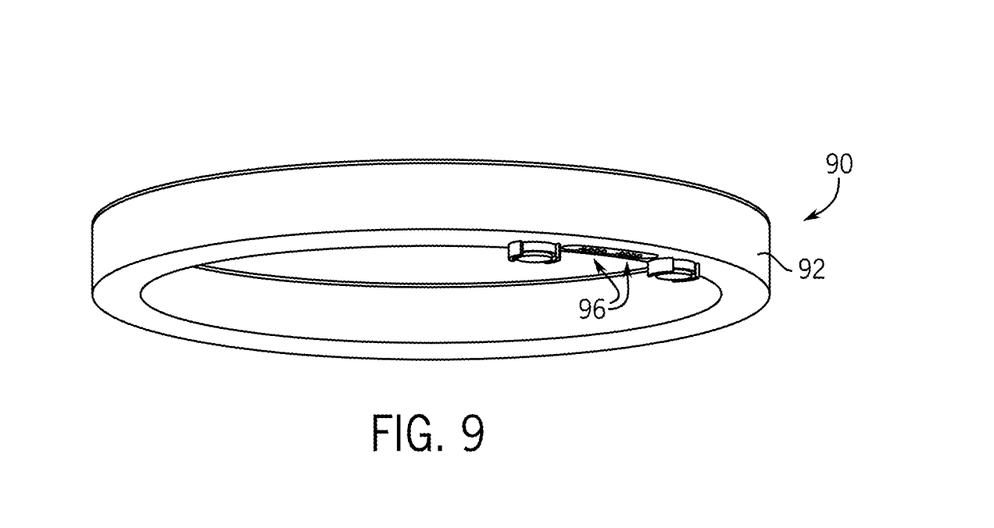
FIG. 9 is a bottom perspective view of the humidification chamber of FIG. 8.
Figure 10:
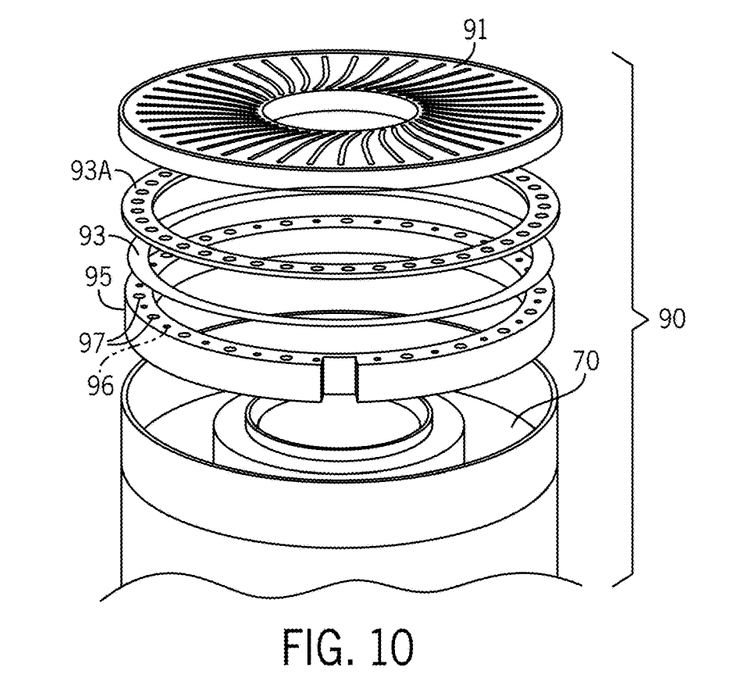
FIGS. 10-10D are top perspective views of the humidification chamber of FIG. 1, with FIG. 10 showing an exploded perspective view, FIG. 10B showing the humidification chamber with the upper vent removed, FIG. 10C showing the cap disk separated from the piezo disk and the wick carrier disk, and FIG. 10D showing the wick carrier disk with the piezo disk removed.

FIGS. 1-12 show an exemplary room air humidifier device 100 providing for improved mist generation, in accordance with an exemplary embodiment the present invention. As shown in FIG. 1-12, the exemplary humidifier 100 includes a housing 10 enclosing and/or supporting a number of components, including a humidification system. Referring now to FIGS. 3 and 10, it will be appreciated that a cover 12 of the housing 10 may be opened and/or removed to access internal components of the device. The exemplary humidifier 100 can principally include a water tank 20, a water filter 40, an ultraviolet-C (UV-C) light source 50, a pump 60, a motorized fan 70, an air filter 80, and a humidification chamber 90 which can be arranged as shown.

Many conventional ultrasonic humidifiers position an upper water tank above a lower reservoir containing a water-atomizing piezoelectric disc or other humidification structures, rely upon gravity to move water into the reservoir, and provide for substantial water accumulation and length of passage of water vapor through the humidifier 100 that can promote undesirable bacterial growth. By contrast, the exemplary embodiment of the present invention positions the water tank 20 below an upper humidification chamber 90 that is at or near an exit point of the humidifier 100. This reduces water accumulation and length of passage of water vapor through the humidifier 100, and thus reduces or eliminates opportunities for bacterial growth. Instead, the water from tank 20 is first filtered by filter 40. The filtered water is then pressurized by a pump 60 and pumped to the upper humidification chamber 90 at or adjacent an exit point of the humidifier 100, near the fan 70 and upper end of the housing 10, as will be appreciated from FIGS. 3 and 12.

The exemplary humidifier 100 includes a water filter 40 configured to filter debris and/or dissolved solids, such as minerals, from charge water contained in the water tank 20, and an ultraviolet light source 50, preferably a UV-C light source (which may include a broad-band light source and/or a UV-C filter), positioned to expose charge water to a dose of radiation operable to kill pathogens contained in the charge water or that would otherwise be dispersed into room air. Further still, the humidifier 100 is provided with a cover 14 having with openings 12 aligned to pass ambient air into and through an air filter 80. The motorized fan 70 is operable to draw inlet air (ambient room air) into the housing 10 and through the filter 80, which can be a HEPA filter comprising HEPA filtration media, and then exhaust the filtered air from the housing 10 along with atomized water entrained in the exhausted air through the humidification chamber 90 and into the surrounding atmosphere. The exemplary device also includes tubing 30 for passage of water from the water tank 20 through the water filter 40, tubing 46 passing from the water filter 40, to and past the UV light source 50, tubing 56 passing from the UV light source 50 through the pump 60, and tubing 66 passing from the pump 60 to the humidification chamber assembly 90, as well as a return line 98 for returning excess water from the humidification chamber 90 to the water tank 20, as will be appreciated from FIG. 12.

As will be appreciated from FIGS. 5-12, the exemplary humidification chamber 90 is located just above/downstream from the motorized fan 70, very near the top of the housing 10, at the exit of the humidifier 100, so there is very little distance between the piezos and the terminal end of the housing 10 where water vapor passing through the housing 10 can accumulate and promote pathogen growth.

In the exemplary embodiment, the humidification chamber 90 is formed as a modular unit, as best shown in FIGS. 8 and 9, so that it is readily replaceable in the event of malfunction, degradation of efficiency, or accumulation of undesirable pathogens. As will be appreciated from FIGS. 7-9, the humidification chamber 90 includes an annular chamber housing 92 containing a plurality of ultrasonic transducer and wick assemblies 94. The annular housing 92 can be dimensioned so that each ultrasonic transducer and wick assembly 94 is positioned outside of the path of the fan blades of motorized fan 70 (beyond their radius, radially), or within the path but in a plane above/downstream of the fan 70, and within the distal portion, e.g., within 10-20% of the distal ends) of the fan blades of motorized fan 70.

Each ultrasonic transducer and wick assembly 94 supports a ceramic piezoelectric diaphragm energizable to vibrate at an ultrasonic frequency to create a mist of water droplets from water drawn from a water reservoir via a small wick aperture by way of capillary action. The humidification chamber assembly includes an electrical connector, such as a set of pin connectors 96 (FIG. 9), for mating with an electrical connector of the humidifier and for supply control and/or power signals to each ultrasonic transducer and wick assembly 94. More particularly, each piezoelectric diaphragm has electrical connections to a power amplifier housing in the upper housing 18, which generates voltage waveform at its resonant frequency to excite mechanical vibration, exciting water droplets from the wick surface layer into the surrounding air. The excited water droplets vaporize depending on the ambient temperature and vapor pressure, water droplet diameter, induced airflow from the fan, and other trace gases present in the air.

Figure 10B:
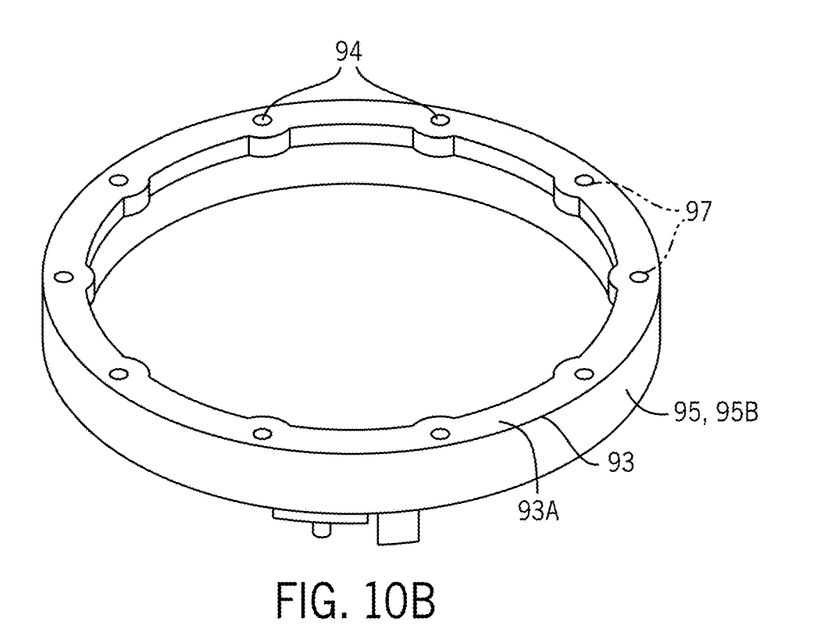
Figure 10C:
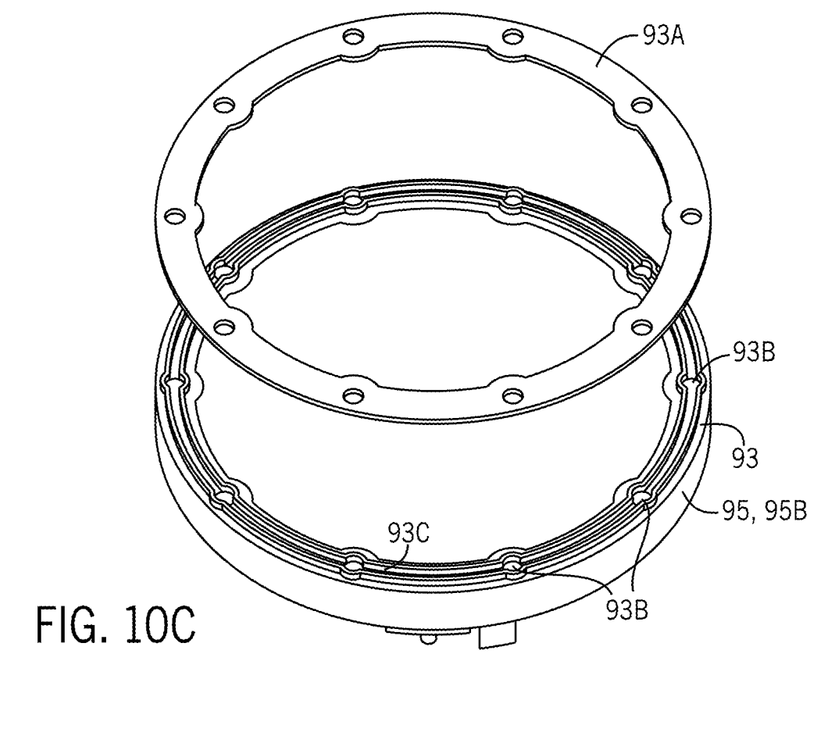
Figure 10D:
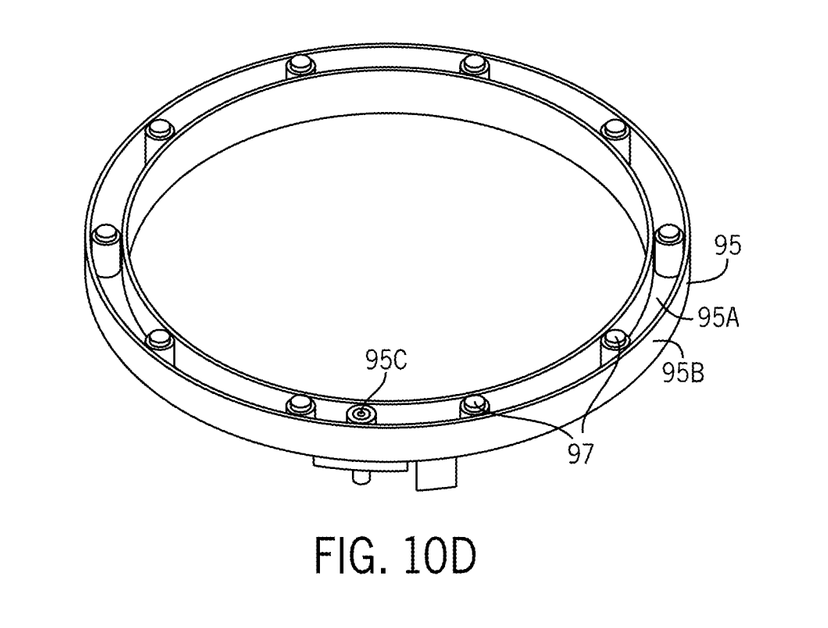
Figure 11:
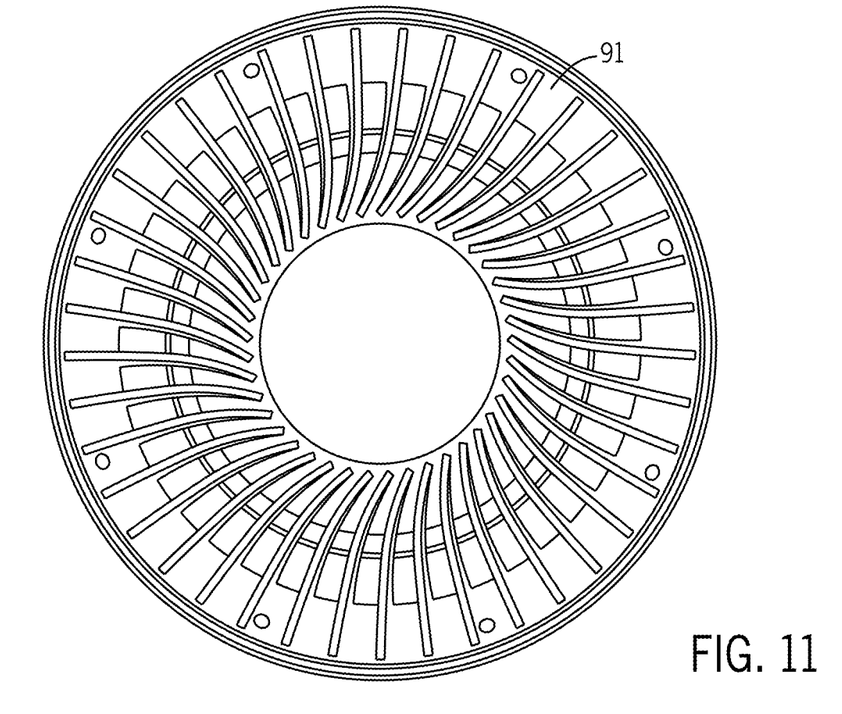
FIG. 11 is a top view of the humidifier of FIG. 1.
Figure 12:
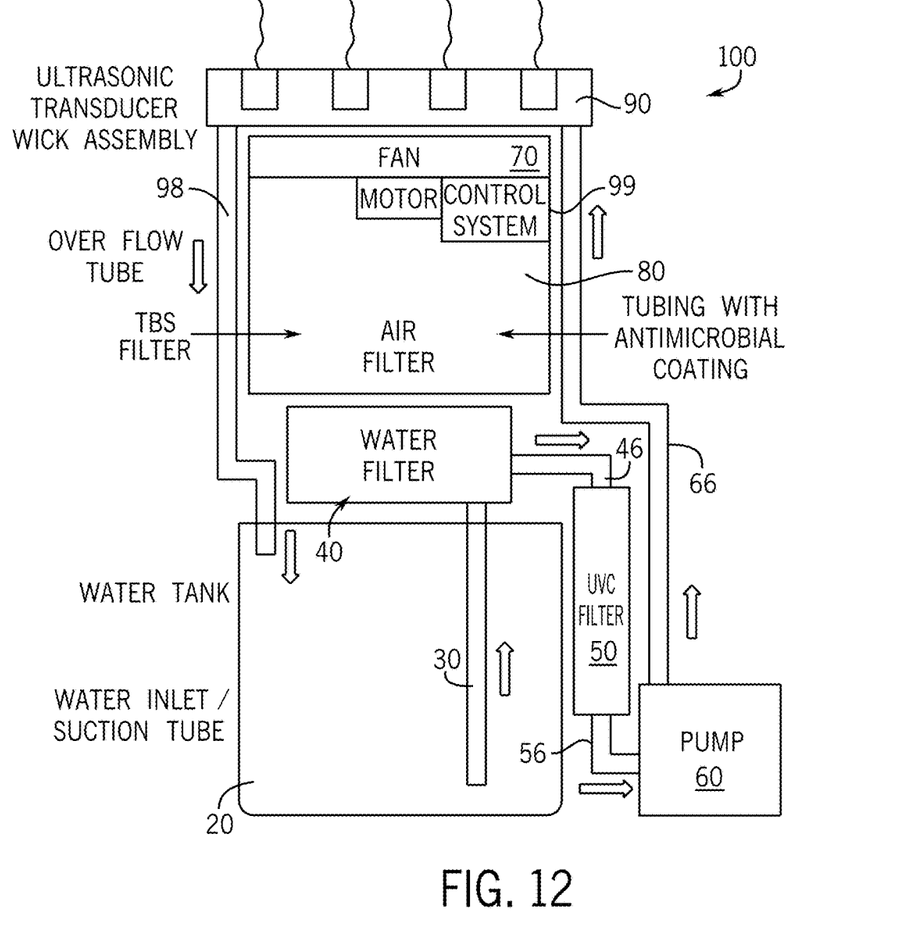
FIG. 12 is a schematic illustrating the components of the exemplary humidifier of FIG. 1.

In the exemplary embodiment of the present invention, the humidification chamber 90 has an upper vent 91 and further includes at least one cap disk 93A (defining the top of housing 92) and at least one ultrasonic piezo disk 93 mounted on top of a wick carrier disk 95 that provides a plurality of watered cylindrical wicks 97. As shown in FIGS. 10B-10D, each ultrasonic transducer and wick assembly 94 includes an ultrasonic transducer 93B (FIG. 10C) in the piezo disk 93, positioned above a watered wick 97 in the wick carrier disk 95. The piezo disk 93 also includes a track 93C for housing an electrical wire that can pass between the transducers 93B. The wick carrier disk 95 can be sized to enable the watered cylindrical wicks 97 to be partially submerged into a dedicated water supply reservoir 96 that is contained within the wick carrier disk 95, as best shown in FIG. 10D. Each piezo disk 93 has electrical connections to a power amplifier housing in the upper housing 18, which generates voltage waveform at its resonant frequency to excite mechanical vibration, extracting water drops from the wick surface layer into the surrounding air. The vibration of each piezo disk 93 can be controlled (by the control system 99) independently depending on the required humidification rate. The extracted water drops vaporize depending on the ambient temperature and vapor pressure, water drop diameter, induced airflow from the fan, and other trace gases present in the air. Preferably, a separate set of electronic connectors is provided for each respective ultrasonic transducer and wick assembly 94, to allow each individual ultrasonic transducer and wick assembly 94 to be controlled independently of the others by way of the control system 99. The control system 99 can selectively send appropriate signals to each ultrasonic transducer and wick assembly 94 by way of the electrical connectors.

A plurality of ultrasonic transducer and wick assemblies 94 are preferably arranged about the humidification chamber 90. For example, the plurality may span the entire 360-degree circumference of the humidification chamber 90, and the plurality of ultrasonic transducer and wick assemblies 94 may be arranged in a circular pattern and may be evenly spaced about the circumference.

By way of example, the control system may control the ultrasonic transducer and wick assemblies 94 by way of one of a plurality of predefined settings and/or to selectively power (and de-power) them, e.g., as a function of user input provided via an input device of the humidifier 100 and/or via a companion software app running on a smartphone or other computerized device in communication with the humidifier 100 and/or its control system 99. For example, the vibration of each ultrasonic transducer and wick assembly 94 can be controlled (by the control system 99) independently or collectively to provide a desired humidification rate, increase or decrease. By way of further example, the control system 99 may be configured not to send signals to a selected one or two of the ultrasonic transducer and wick assemblies 94 when those one or two ultrasonic transducer and wick assemblies are presently positioned immediately adjacent a wall or furniture that could be damaged by water mist produced by the selected one or two ultrasonic transducer and wick assemblies. By way of alternative example, one or more selected ultrasonic transducer and wick assemblies 94 could be turned off after an initial period of mist production, e.g., to limit the overall mist production and to avoid excessive humidity. By way of another example, the group of ultrasonic transducer and wick assemblies 94 may be controlled as a unit, while each is turned on and off individually, to produce a desired effect primarily for appearance or whimsical purposes. For example, all ultrasonic transducers and wick assemblies 94 could be turned on, then off, in unison to produce a smoke-ring-like effect, or each ultrasonic transducer and wick assembly 94 could be turned on, then off, in sequence around the periphery of the ring, or in other fashions, to produce a "dancing fountain"-like effect.

In the exemplary humidification chamber 90, each ultrasonic transducer and wick assembly 94 includes a transducer 93B in a respective ultrasonic piezo disk 93, mounted on top of a watered wick 97 in a respective wick carrier disk 95. The transducers 93B can be arranged in a circular pattern on the piezo disk 93 and can be evenly spaced from each other. The watered wicks 97 can be arranged in a circular pattern in the wick carrier disk 95 and can be evenly spaced from each other. A watertight cap disk 93A covers the wire track 93C in the piezo disk that passes between the transducers 93B. The wicks 97 may be cylindrical or disk-like and they define an opening extending therethrough for uptake of water via capillary action. The housing 92 of the humidification chamber assembly 90 can be defined by the cap disk 93A and the wick carrier disk 95, the latter of which can define a lower reservoir 95A that is supplied with water from the water tank 20 by appropriate tubing, and that acts as a dedicated reservoir for the wicks 97. The wicks 97 are at least partially (on their lower surfaces) submerged into the lower reservoir 95A. The lower reservoir 95A further defines a wall 95B acting as a spillway for the trough, to drain water from the trough 95A, and an opening 95C adjacent the spillway/wall 95B for draining water back to the water tank 20, as best shown in FIG. 10D. In certain embodiments, the humidification chamber 90 is further provided with an overflow valve that cycles excess clean water back to the water tank to prevent leakage from the top side.

The present invention provides a humidifier 100 that provides for improved mist generation, to provide for rapid evaporation and rapid humidification, even at low fan speeds, and to avoid common problems such as bacteria/pathogen growth associated with conventional approaches. Further, in certain embodiments, the humidification chamber 90 providing mist generation is configured as a modular unit that is readily replaceable in the event of malfunction, degradation of efficiency, or accumulation of undesirable pathogens.

The water-contacting and mist-exposed surfaces of the housing 92 of the humidification chamber 90 can be coated with, or impregnated with, antimicrobial or hydrophobic additives to avoid the growth of pathogens that would be harmful if aerosolized and inhaled. Additional embodiments of the humidifier 100 are provided in copending U.S. patent application Ser. No. 18/090,662, published as US 2023/0324061 A1, filed on even date herewith by the same Applicant, entitled "Humidifier With Reduced Aerosolization Of Pathogens And Dissolved Solids Found In Source Water," the disclosure of which is incorporated herein by reference.

Accordingly, it will be appreciated that the present invention provides for the use of a modular assembly that may be replaced in the event of pathogen growth or a decrease in performance. More particularly, an ultrasonic transducer-supporting ring is packed inside a plastic piezo chamber which houses the ring, electrical contacts, and wick materials, and that allows the user to replace the entire humidification chamber assembly 90 in times of replacement or maintenance.

Further, it will be appreciated that the housing 92 can be constructed in an annular fashion to provide support structure for supporting the mist-generating structures around, and preferably outside of, the path of the fan's blades. Further, the use of multiple ultrasonic transducers 93B around the humidification chamber 90 allows for a more distribution of water droplets into the incoming air as compared with a single transducer or a centrally located transducer. Overall, this arrangement provides a technological solution allowing faster humidification and quick evaporation at low airspeed due to the presence of multiple low intensity mist generation sites around the air stream. The ability to use a low airspeed means that the motorized fan can be run at a lower fan speed, which results in a reduction in fan-related noise, which is desirable.

Further, the humidification chamber 90 maintains an optimum water level in the surrounding room with the help of a water level regulation mechanism, namely the wall/spillway, for optimum water transport, which in turn results in improved performance.

Further still, in this exemplary embodiment, since water is purified before entry into the humidification chamber 90 for vaporization, there is less maintenance required of an ultrasonic system as opposed to steam. The wick material offers a high rate of water transport and can be embedded with antimicrobial additives which will help to keep the module pathogen-free.

It will be appreciated that the water filter 40, UV light source 50 and pump 60 can be arranged in any order. To maximize the filtration performance, particular pump characteristics, water filter structure and UV light source power should be considered, and parameters should be coordinated to provide the desired efficacy.

Figure 13:
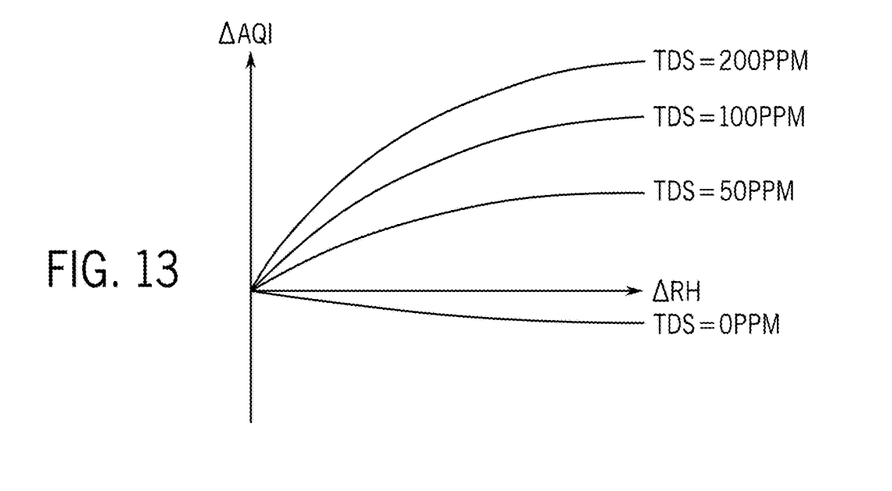
FIG. 13 is a graph illustrating the relationship between relative humidity and air quality index for water containing dissolved solids.

FIG. 13 is a graph illustrating the relationship between relative humidity and air quality index for water containing dissolved solids. More particularly, FIG. 13 shows the observed increase in a particulate matter concentration in room air during ultrasonic vaporization of non-zero total dissolved solids (TDS) water, where AAQI is the increase in air quality index and ARH is the increase in relative humidity. In accordance with the present invention, an exemplary control system 99 (e.g., housed in the upper housing 18) takes into account the impact of the TDS on the room AQI levels. The theoretical relationship between increase in AQI and increase in relative humidity due to vaporization of TDS containing water is depicted in the FIG. 13. As can be seen in FIG. 13, if there is an increase in the relative humidity due to vaporizing non-zero TDS water into the room, then AQI is always elevated due to the generated fine particulate matter in the air as a side effect of the vaporization of water containing TDS. If the TDS of the water is close to zero, then the effect on room AQI due to humidification can be in the reversed. The generated water droplets may help bonding the dispersed particulate material in the air, hence, increasing their aerodynamic diameter. As a result, bonded larger particles may get heavier and tend to drop gravitationally out of the air concentration. Therefore, the water purification system significantly improves humidifier performance.

The control system 99 is operatively connected to the system components to provide a suitable signal to the components to control the humidifier as described herein. As will be appreciated by those skilled in the art, the control system may comprise a printed circuit board supporting electrical components implementing suitable logic for operating the humidifier as described herein.

Generally speaking, the control system is composed of hardware level and software level layers. With respect to the software level, the control system is implemented as an executable entity in a dedicated microcontroller integrated circuit (IC). The control algorithm is commonly performing discrete-event functions consistent with the description herein. The control software of the humidifier is a composition of various loops of control dedicated to various functions requested by the device.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A humidifier for humidifying room air, the humidifier comprising:

a housing;

a water tank in the housing, the water tank defining a reservoir for containing water;

a humidification chamber comprising an annular housing supporting a plurality of ultrasonic transducer and wick assemblies, each assembly including an ultrasonic transducer that is energizable to generate a water mist from the water and a watered wick;

a motorized fan operable to create a flow of air moving from the humidification chamber to an exterior of the housing;

a pump configured to drive the water from the reservoir and to the humidification chamber; and a control system operable to control operation of the motorized fan and to energize each of the ultrasonic transducers to generate the water mist, and to cause the water mist to become entrained in the flow of air moving from the humidification chamber to the exterior of the housing.

2. The humidifier of claim 1, further comprising a water filter in the housing positioned downstream from the water tank.

3. The humidifier of claim 1, further comprising an ultraviolet light source in the housing positioned downstream from the water tank.

4. The humidifier of claim 1, wherein the ultrasonic transducer and wick assemblies are arranged around a circumference of the humidification chamber.

5. The humidifier of claim 1, wherein the humidification chamber further comprises a piezo disk and the ultrasonic transducers are arranged in the piezo disk.

6. The humidifier of claim 5, wherein the piezo disk further comprises a wire track and the humidification chamber further comprises a cap disk positioned above the piezo disk.

7. The humidifier of claim 5, wherein the humidification chamber further comprises a wick carrier disk and the watered wicks are arranged in the wick carrier disk.

8. The humidifier of claim 7, wherein the wick carrier disk further comprises a dedicated reservoir containing water and the watered wicks are partially submerged in the dedicated reservoir.

9. The humidifier of claim 1, wherein the ultrasonic transducers are independently controllable by the controller.

10. The humidifier of claim 1, wherein the humidification chamber further comprises an overflow valve for directing excess water back to the water tank.

11. A humidifier for humidifying room air, the humidifier comprising:

a housing;

a water tank in the housing, the water tank defining a reservoir for containing water;

a water filter in the housing positioned downstream from the water tank;

an ultraviolet light source in the housing positioned downstream from the water tank;

a humidification chamber comprising an annular housing supporting a plurality of ultrasonic transducer and wick assemblies, each assembly including an ultrasonic transducer that is energizable to generate a water mist from the water and a watered wick;

a motorized fan operable to create a flow of air moving from the humidification chamber to an exterior of the housing;

a pump configured to drive the water from the reservoir, through the water filter, past the ultraviolet light source, and to the humidification chamber; and a control system operable to control operation of the motorized fan and to energize each of the ultrasonic transducers to generate the water mist, and to cause the water mist to become entrained in the flow of air moving from the humidification chamber to the exterior of the housing.

12. The humidifier of claim 11, wherein the ultrasonic transducer and wick assemblies are arranged in a circular pattern in the humidification chamber.

13. The humidifier of claim 11, wherein the humidification chamber further comprises a piezo disk and the ultrasonic transducers are arranged in a circular pattern in the piezo disk.

14. The humidifier of claim 13, wherein the piezo disk further comprises a wire track and the humidification chamber further comprises a cap disk positioned above the piezo disk.

15. The humidifier of claim 13, wherein the humidification chamber further comprises a wick carrier disk and the watered wicks are arranged in a circular pattern in the wick carrier disk.

16. The humidifier of claim 15, wherein the wick carrier disk further comprises a dedicated reservoir containing water and the watered wicks are partially submerged in the dedicated reservoir.

17. The humidifier of claim 1, wherein the ultrasonic transducers are independently controllable by the controller.

18. A humidifier for humidifying room air, the humidifier comprising:
   a housing;
   a water tank in the housing, the water tank defining a reservoir for containing water;
   a water filter in the housing positioned downstream from the water tank;
   an ultraviolet light source in the housing positioned downstream from the water tank;
   a humidification chamber comprising an annular housing supporting a piezo disk, a wick carrier disk, and a plurality of ultrasonic transducer and wick assemblies, each assembly including an ultrasonic transducer in the piezo disk that is energizable to generate a water mist from the water and a watered wick in the wick carrier disk;
   a motorized fan operable to create a flow of air moving from the humidification chamber to an exterior of the housing;
   a pump configured to drive the water from the reservoir, through the water filter, past the ultraviolet light source, and to the humidification chamber; and
   a control system operable to control operation of the motorized fan and to independently energize each of the ultrasonic transducers to generate the water mist, and to cause the water mist to become entrained in the flow of air moving from the humidification chamber to the exterior of the housing.

19. The humidifier of claim 18, wherein the wick carrier disk further comprises a dedicated reservoir containing water and the watered wicks are partially submerged in the dedicated reservoir.

20. The humidifier of claim 18, wherein the ultrasonic transducer and wick assemblies are arranged in a circular pattern.

* * * * *